United States Patent
Wade

(10) Patent No.: US 9,479,828 B2
(45) Date of Patent: *Oct. 25, 2016

(54) TUNE-IN BUTTON

(71) Applicant: Peel Technologies, Inc., Mountain View, CA (US)

(72) Inventor: Matson Lloyd Wade, Redwood City, CA (US)

(73) Assignee: Peel Technologies, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,610

(22) Filed: Jan. 30, 2015

(65) Prior Publication Data

US 2015/0289007 A1 Oct. 8, 2015

Related U.S. Application Data

(63) Continuation of application No. 14/245,987, filed on Apr. 4, 2014, now Pat. No. 8,982,285.

(51) Int. Cl.
| | |
|---|---|
| *H04N 5/44* | (2011.01) |
| *H04N 5/50* | (2006.01) |
| *H04N 21/438* | (2011.01) |
| *H04N 21/422* | (2011.01) |
| *H04N 21/4788* | (2011.01) |
| *H04N 21/41* | (2011.01) |
| *H04N 21/482* | (2011.01) |
| *H04N 21/643* | (2011.01) |

(52) U.S. Cl.
CPC ........ *H04N 21/4383* (2013.01); *H04N 5/4403* (2013.01); *H04N 5/50* (2013.01); *H04N 21/4126* (2013.01); *H04N 21/4222* (2013.01); *H04N 21/42221* (2013.01); *H04N 21/4788* (2013.01); *H04N 21/4821* (2013.01); *H04N 21/64322* (2013.01); *H04N 2005/4425* (2013.01)

(58) Field of Classification Search
CPC .. H04N 5/50; H04N 5/4403; H04N 21/4222; H04N 21/4383; H04N 21/64322; H04N 21/4126; H04N 21/4821; H04N 21/4788
USPC .......................................................... 348/731
See application file for complete search history.

(56) References Cited

U.S. PATENT DOCUMENTS

| | | | |
|---|---|---|---|
| 8,982,285 B1 * | 3/2015 | Wade | H04N 5/50 340/12.25 |
| 2005/0055716 A1 | 3/2005 | Louie et al. | |

(Continued)

OTHER PUBLICATIONS

United States Office Action, U.S. Appl. No. 14/245,987, Jul. 2, 2014, seven pages.

*Primary Examiner* — Michael Lee
(74) *Attorney, Agent, or Firm* — Fenwick & West LLP

(57) ABSTRACT

A system and a method are disclosed for selecting a television function on a channel control system through a mobile device. A request to select the television function is received. The request may be generated in response to activating a link or element in an application configured on a computing device. The television function associated with the request is to select a television broadcast channel showing a particular television program. A channel showing the particular television program is determined. An infrared code comprising an instruction to select the television function associated with the determined channel is received. The system and method allow a user to access broadcast television programs from an online interface.

20 Claims, 4 Drawing Sheets

(56) References Cited

U.S. PATENT DOCUMENTS

2008/0225184 A1* 9/2008 Hardacker ........... H04N 5/4403 348/734

2010/0192180 A1 7/2010 Olague et al.
2015/0067805 A1* 3/2015 Martin ................. H04W 12/06 726/7

* cited by examiner

TUNE-IN BUTTON

CROSS REFERENCE TO RELATED APPLICATIONS

This application is a continuation of U.S. application Ser. No. 14/245,987, filed Apr. 4, 2014, which is incorporated by reference herein in its entirety

BACKGROUND

1. Field of Art

The disclosure generally relates to the field of television control and more specifically to sending instructions to a channel control system through a computing device.

2. Description of the Related Art

Internet users increasingly share media content online. Users share media by posting links to images, videos, and articles on websites. For example, a user may share a video on a social networking website. Connections of the user may interact with the shared video, expanding the shared video's audience.

However, some forms of media content cannot be posted online. Television shows, for example, are conventionally shown on broadcast television and cannot be linked to online. Users who wish to share portions of television shows with their friends must wait until the television show is uploaded or otherwise released online, which may not occur until after the television show has been aired.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One example embodiment of a disclosed system, method and computer readable storage medium for selecting a television function allows a user to select a television function through a computing device. A request from an application configured on a computing device to select a television function is received. In one embodiment, the request to select the television function is a request to select a television channel showing a particular television program. A location identifier, which identifies the location of the computing device, is received. The location identifier is sent from a geolocation server in response to a request for the location identifier. A television function identifier, which specifies a television function associated with the request to select the television function, is received based on the received location identifier. The identified television function may be to select a channel currently showing the particular television program. The television function identifier is sent in response to sending a request to an electronic program guide server, which determines a channel showing the particular television program. An infrared (IR) code, which includes an instruction to perform the television function associated with the television function identifier, is received. The IR code is subsequently output.

System Architecture

Figure 1:
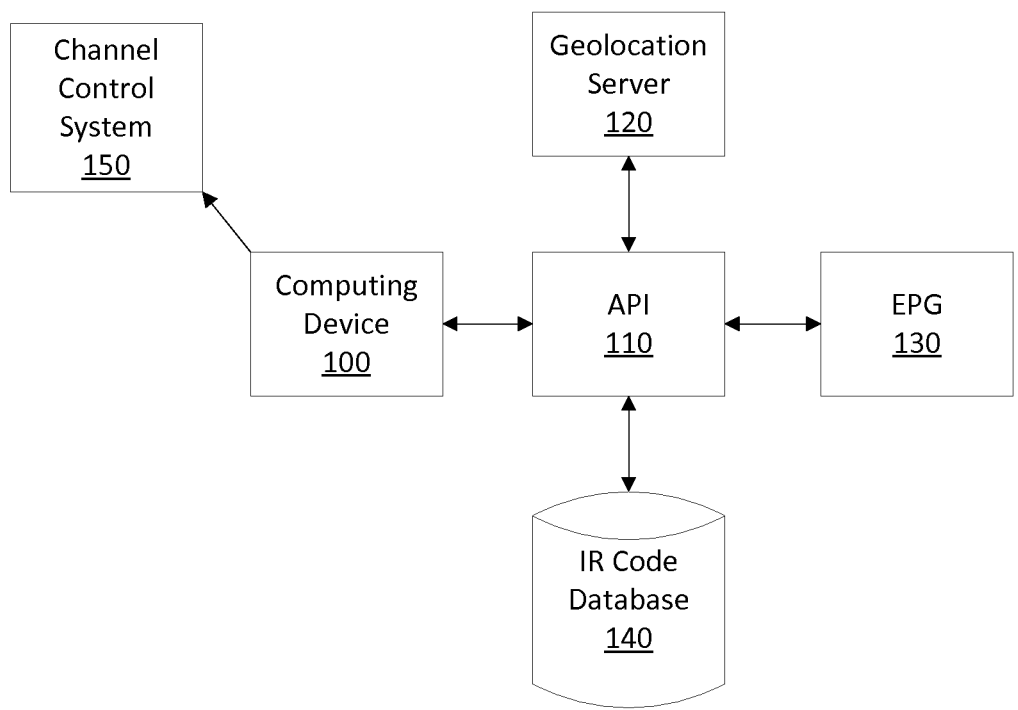
FIG. 1 illustrates one embodiment of a system for selecting a television function for a channel control system through a computing device, according to one example embodiment.

FIG. 1 illustrates one embodiment of a system environment for selecting a television function for a channel control system through a computing device, according to one example embodiment. The illustrated embodiment of the system environment includes a computing device 100, an application programming interface (API) 110, a geolocation server 120, an electronic programming guide 130, an infrared code database 140, and a channel control system 150. Other example embodiments of the system environment may include additional or alternative components with similar functionality.

The computing device 100 is an electronic device used to generate a request for an infrared (IR) code. The computing device 100 may be a smartphone, a tablet, a personal computer (PC), or any other conventional computing device. The computing device 100 may alternatively be a remote control or other conventional electronic device configured for use with a television system. The computing device 100 includes a processor, a system memory, a user interface, and a network interface. The processor may be a microprocessor or an application-specific integrated circuit (ASIC) that executes one or more instructions stored in the system memory and/or processes input from the user interface. The user interface receives commands from the user to the computing device. The user interface may be one or more buttons, knobs, joysticks, keypads, touchscreens, or other conventional user interfaces. Other user interfaces may additionally include a screen, a display, a light, or other component that outputs information to a user of the computing device 100. The network interface connects the computing device 100 to one or more wired or wireless networks. The network interface may use network technologies such as Ethernet, 802.11, worldwide interoperability for microwave access (WiMAX), 3G, 4G, Long Term Evolution (LTE), code division multiple access (CDMA), digital subscriber line (DSL), or other conventional network technologies. Examples of networking protocols used include multiprotocol label switching (MPLS), transmission control protocol/Internet protocol (TCP/IP), hypertext transport protocol (HTTPS), simple mail transfer protocol (SMTP), and file transfer protocol (FTP). In some embodiments, some or all of the data is encrypted using any suitable technique or techniques.

Some example embodiments of the computing device 100 include an IR transmitter and/or an IR receiver. The added IR components allow the computing device 100 to send and/or receive infrared signals. This allows the computing device 100 to interface with many conventional channel control systems 150 that only communicate through infrared signals. The IR transmitter and/or receiver may be configured within the computing device 100 or may be connected to the computing device 100 as external hardware configured for use with the computing device.

The application programming interface (API) 110 is software code that includes instructions to execute the disclosed method. The API 110 may be configured to execute the disclosed method on the computing device 100. Alternatively, the API 110 may be configured to execute the disclosed method on a server, comprising a processor and a non-transitory computer storage medium, connected to the computing device 100 through a network. In one embodiment, the API 110 receives a request to select a television function from an application on the computing device 100. The API 110 processes the request by sending and/or receiving requests to various servers and databases, which are described below. After processing the request to select the television function, the API 110 sends instructions for selecting the television function to the computing device 100.

The geolocation server 120 determines the location of one or more computing devices 100. The geolocation server 120 is a server comprising a database that associates a location with a computing device identity. The geolocation server 120 receives a request for a location identifier associated with the computing device 100. The location may be presented as a ZIP code, a set of latitude and longitude coordinates, a street address, or any other conventional location identifier. The request may be associated with a computing device identity. The computing device identity may be the computing device's internet protocol address, a serial number, or any other unique identifier associated with the computing device 100. Responsive to receiving the computing device's Internet Protocol (IP) address, the geolocation server 120 determines a location identifier associated with the computing device 100. Additionally or alternatively, the geolocation server 120 determines a service provider identifier associated with the computing device 100. The service provider associated with the service provider identifier is associated with the computing device 100. For example, the service provider may be an internet service provider (ISP) providing network access to the computing device 100. Since users are likely to use the same service provider for all their home network services (which may include phone, internet, TV services), the service provider is likely to also provide television service to the user.

The electronic program guide (EPG) 130 determines one or more channels a particular television program is playing on. The EPG 130 comprises one or more databases that include program guide information. The program guide information lists one or more television channels showing one or more television programs. In this context, "television program" may refer to a TV show, a movie, a media segment, a video stream, or a live TV feed. The program guide information may be specific to a service provider or a location. For example, each location identifier or service provider identifier may be associated with a different set of program guide information.

In one or more embodiments, the EPG 130 is not limited to program guide information associated with broadcast television channels. In one or more embodiments, the EPG 130 additionally includes program guide information for channels or television programs hosted on one or more streaming websites. Examples of streaming websites include but are not limited to HULU, NETFLIX, and AMAZON PRIME INSTANT VIDEO. These examples of online streaming websites may comprise traditional broadcast channels and/or "on-demand" channels that begin showing a television program when the user accesses the channel.

The EPG 130 receives a request for a television function identifier. In one example embodiment, the television function associated with the television function identifier may be to select a channel showing a particular television program. The EPG 130 determines the television function identifier by determining the channel showing the particular television program. The determination of the channel, which is one of the channels included in the program guide information, is based on the location identifier and/or the service provider identifier. The television function identifier includes information that identifies the television channel, including but not limited to a broadcast channel number (e.g., "Channel 2"), a broadcast channel frequency (e.g., 54-60 MHz), or a television station (e.g., ABC). Other example embodiments of the television function include adjusting a television's volume output, adjusting the television's picture, turning the television on and off, selecting the television's input, or any other conventional television function.

In some cases, the EPG 130 cannot determine a channel showing the particular television program. In these cases, the EPG 130 may generate a notification stating the television program cannot be found. In other embodiments, the EPG 130 may include in the notification one or more inaccessible channels that are showing the particular television program. For example, if the requested television program is only playing on HBO or on another premium cable channel the channel control system 150 cannot access, the EPG 130 may return a notification stating that the television program is being shown on the inaccessible channel. Furthermore, the notification may provide the option for accessing the channel for a fee or service upgrade.

In other cases, the EPG 130 determines one or more channels that showed the television program in the past if the EPG 130 cannot determine a channel currently showing the television program. The EPG 130 returns a television function identifier for selecting one of the channels that showed the television program in the past.

In other cases, the EPG 130 may determine that multiple channels are showing the disclosed television program. The EPG 130 may determine which of the multiple channels showing the television to select based on channel viewership, channel coverage, advertising revenue, or any other business logic. For example, if a basketball game is being shown on a local channel and a national channel, the EPG 130 may give preference to the national channel. The EPG 130 may also determine which of the multiple channels showing the disclosed television program to select based on the reception quality. For example, the EPG 130 may select the television channel showing the disclosed program in the highest picture quality.

The IR code database 140 determines an instruction to select the television function. The IR code database 140 is a server that stores one or more predetermined instructions. The IR code database 140 may additionally or alternatively generate the instruction to select the television function.

The IR code database 140 determines the infrared code associated with the television function identifier. The infrared code comprises instructions to select the television function identifier determined by the EPG 130. The IR code database 140 receives a request for the infrared code. The IR code database 140 determines the infrared code associated with the television function. The infrared code may be encoded in a specific communication format or standard. For example, the infrared code may be encoded according to one of the RC-5, RC-6, SIRC, S-Link, RECS-80, NEC, IrPHY, or any other conventional infrared communication formats.

The channel control system 150 receives the instruction to select the television function. The channel control system 150 includes a receiver configured to execute the television function in response to receiving the instruction to select the television function. The channel control system 150 may be a set-top box (STB), a digital video recorder (DVR), or a digital media player connected to a television. The channel control system 150 may alternatively be configured within the television. In some embodiments, instructions to select different television functions are received by different elements of the channel control system 150. For example, the channel control system 150 may include a television and a STB. The STB may receive instructions for selecting a channel while the television receives instructions for adjusting volume.

Figure 2:
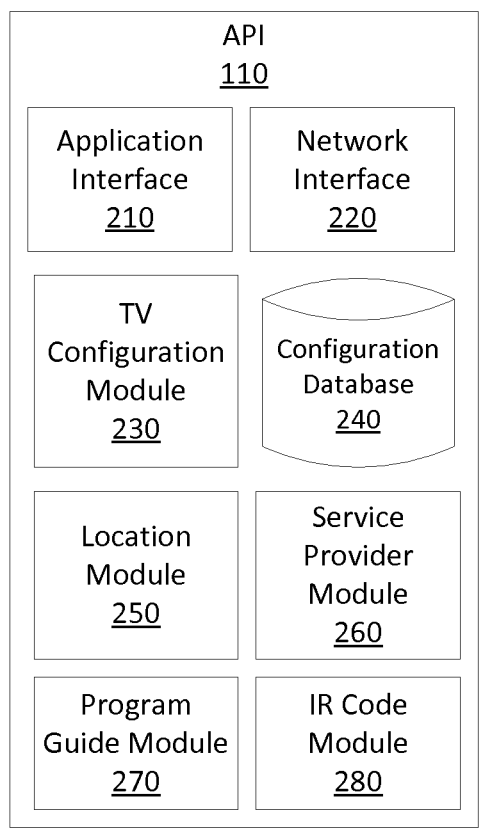
FIG. 2 illustrates one embodiment of an application programming interface (API) that facilitates selecting a television function for a channel control system through a computing device, according to one example embodiment.

Referring now to FIG. 2, illustrated is one embodiment of an application programming interface (API) 110 that facilitates selecting a television function for a channel control system through a computing device, according to one example embodiment. The illustrated embodiment of the API 110 includes an application interface 210, a network interface 220, a TV configuration module 230, a configuration database 240, a location module 250, a service provider module 260, a program guide module 270, and an IR code module 280. The modules may be embodied as hardware components, software modules, or a combination of both. Alternative embodiments of the API 110 may include additional or alternative modules.

The application interface 210 receives a request from an application configured on the computing device 100. The application may be any conventional application or software program. The request is for selecting a television function on the channel control system 150 through the computing device 100. In one embodiment, the request is for selecting on the channel control system 150 a channel showing a particular television program. In this embodiment, the request from the application includes information identifying the particular television program. In one example, the request is received in response to a user interacting with an element in the application. For example, the request may be in response to the user activating a posted link or other user interface element in the application that requests the particular television program to be displayed on a television.

The configuration module 230 receives and processes configuration information. The configuration information includes model information associated with the channel control system 150. The model information indicates a communication standard used to communicate with the channel control system 150. For example, configuration information identifying the channel control system 150 as a cable or satellite television service provider, e.g., COMCAST, COX, DIRECTTV, DISH, set top box may indicate that the channel control system 150 communicates using infrared signals sent in an RC-5 infrared signal format. In another example, configuration information identifying the channel control system 150 as a manufacturer, e.g., SONY, SAMSUNG, LG, television may indicate that the channel control system 150 communicates using an S-link infrared communication standard. Additionally, configuration information may include a service provider identifier associated with the channel control system 150. Configuration information for one or more channel control systems 150 is stored in the configuration database 240.

The location module 250 determines the location identifier. The location module receives a request for the location identifier. In one embodiment, the request includes the IP address for the computing device 100. The location module 250 determines the location of the computing device 100 by sending a request to the geolocation server 120. The location module 250 subsequently receives and processes a response to the request from the geolocation server 120. The response to the request from the geolocation server 120 includes the location identifier, which may be a ZIP code, a set of latitude and longitude coordinates, a street address, or any other conventional geographic location indicator. Alternatively, the location module 250 may generate the location identifier without sending a request to the geolocation server 120. For example, the location module may determine a location based on GPS coordinates or other location information generated by the computing device 100.

The service provider module 260 determines a service provider associated with the channel control system 150. The service provider provides users access to broadcast television channels. Examples of television service providers include COMCAST, COX, DIRECTV, DISH, and similar providers. In a first embodiment, the service provider module 260 receives a request that includes the location identifier. The service provider determines the television service provider operating at the location specified by the location identifier. In these cases, there may only be one television service provider operating in the area. In a second embodiment, the request to the service provider module 260 includes the IP address of the computing device 100. In this embodiment, the service provider module 260 determines the service provider based on the IP address. The service provider may be associated with both the IP address of the computing device 100 and the channel control system 150, since many users utilize the same service provider for internet, telephone, and/or television services. Thus, the IP address of the user's computing device 100 may be associated with the service provider for the user's channel control system 150. In a third embodiment, the service provider module 260 determines the television service provider using configuration information received by the configuration module 230.

The program guide module 270 determines the television function identifier associated with the request for the infrared code. In one embodiment, the television function identifier specifies a channel showing the television program specified in the request for the infrared code. The program guide module 270 receives a request for a television function identifier that includes a television service provider identity and an identity of a television program. In this case, the requested television function may be to select the channel or channels showing the television program. The program guide module 270 accesses program guide information associated with the service provider identity to determine the channel showing the television program specified in the request for the infrared code. The program guide module 270 may also access program guide information associated with one or more video streaming websites to determine if the television program is shown on one or more channels hosted on an online streaming service.

The IR code module 280 selects the infrared code associated with the determined television function identifier. The IR code module 280 receives a request for the infrared code associated with the television function identifier. The request includes configuration information associated with the channel control system 150. In one embodiment, the IR code module 280 selects the infrared code by receiving the infrared code from the infrared code database 140. The infrared code may be received in response to sending a request for the infrared code to the infrared database 140. In another embodiment, the IR code module 280 generates the infrared code based on the received television function identifier.

The network interface 220 links the API 110 with the geolocation server 120, the EPG 130, and the infrared code database 140. The network interface may use network technologies such as Ethernet, 802.11, worldwide interoperability for microwave access (WiMAX), 3G, 4G, Long Term Evolution (LTE), code division multiple access (CDMA), digital subscriber line (DSL), etc. Examples of networking protocols used include multiprotocol label switching (MPLS), transmission control protocol/Internet protocol (TCP/IP), hypertext transport protocol (HTTPS), simple mail transfer protocol (SMTP), and file transfer protocol (FTP). In some embodiments, some or all of the data is encrypted using any suitable technique or techniques.

Example Method for Selecting a Television Function

Figure 3:
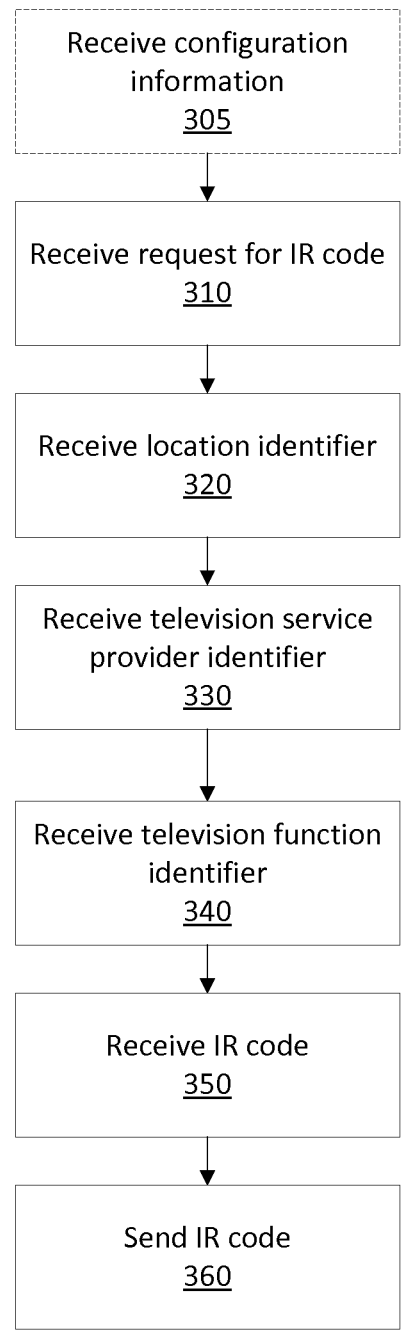
FIG. 3 illustrates one embodiment of a method for selecting a television function for a channel control system through a computing device, according to one example embodiment.

Referring now to FIG. 3, illustrated is one embodiment of a method for selecting a television function for a channel control system through a computing device, according to one example embodiment. All steps may be performed by the API 110 configured on the computing device 100. In other embodiments of the invention, the steps may be performed by the API 110 configured on a server connected to the computing device 100 through a network.

The API 110 receives 305 configuration information. The configuration information includes model information associated with the channel control system 150. This model information may indicate a model of channel control system 150. Furthermore, the configuration information may identify a communication format or standard for the instructions sent to the channel control system 150. For example, the configuration information may indicate that instructions to the channel control system 150 are sent through infrared signals encoded in a particular format. In another embodiment, the configuration information identifies a model of channel control system 150. The model may be associated with one or more compatible communications standards. The configuration information for a particular channel control system 150 may be stored such that the computing device 100 does not have to receive 305 configuration information each time a request to select a television function for the channel control system 150 is received.

The API 110 receives 310 a request for the infrared code. The infrared code includes an instruction to perform a television function on the channel control system 150 associated with the received 305 configuration information. In one embodiment, the television function may be to select a channel on the channel control system 150. The channel may be a channel showing a particular television program. The television program may be a TV show, a movie, a media segment, a video clip, a video stream, or a live TV feed. While the channel may be a broadcast television channel, the channel may alternatively be an on-demand channel. The on-demand channel may be obtained through broadcast television (e.g., pay-per-view television) or from an online streaming source (e.g., video streaming website). In some example embodiments, the request for the infrared code specifies a channel to select on the channel control system 150. In other embodiments, the request for the infrared code specifies the particular television program to be shown on the selected channel, but does not specify a particular television channel to select. In other words, the received 310 request additionally includes a request to determine a channel playing the particular television program.

The received request may be sent from an application configured on the computing device 100. In one embodiment, the request is received 310 in response to a user activating a link in an application on the computing device 100. In one embodiment, the link may indicate that a particular television program will be displayed on a television system connected to the channel control system 150. The link may be embedded in an online post or on a website accessible through a browser configured on the computing device 100.

The API 110 receives 320 a location identifier. The location identifier indicates the location of the computing device 100. The location identifier may be a ZIP code, a street address, geographic latitude and longitude coordinates, or any other apparent location identifier. The computing device 100 may receive 320 the location identifier in response to the API 110 sending a request for location information. The request for location information may include the computing device's IP address.

The API 110 receives 330 a television service provider identifier. The television service provider identifier identifies a television service provider associated with the location identifier. The television service provider identifier may be received 330 in response to a request for television service provider information. The request includes the received 320 location identifier. The received 330 television service provider identifier is that of a television service provider operating at the location specified by the location identifier. In many cases, only one television service provider operates in a given area. Thus, there may only be one television service provider identifier associated with a given location identifier. In another embodiment, the television service provider is determined by analyzing the received 305 configuration information. The configuration information may comprise information associated with the television service provider, such as the service provider identifier.

The API 110 receives 340 a television function identifier. The television function identifier is associated with the request for the infrared code. For example, if the received 310 request for infrared code is for a request to select a channel showing a particular television program, the television function identifier may specify one or more channels showing the particular television program. The television function identifier may specify the channel with a channel number (e.g., Channel 2), a broadcast frequency range (e.g., between 54 and 60 MHz), by a URL, or any other apparent identifier.

The television function identifier may be received 340 in response to a request sent to the EPG 130. The request to the EPG 130 may include the identity of the television program specified in the received 310 request for infrared code and a television service provider identity. The received 340 response to the request to the EPG 130 includes the television function identifier. The television function identifier may be an instruction to select a channel showing the particular television show specified by the request for the infrared code.

The API 110 receives 350 an infrared code. The infrared code comprises an instruction to select the television function associated with the received 340 television function identifier. The instructions included in the infrared code are encoded in a format or standard specified by the received 305 configuration information. In other embodiments, the infrared code is encoded as an instruction sent over a wired or wireless network.

The infrared code may be received 350 in response to a request sent to the infrared code database 140. The request to the infrared code database 140 may include the received 340 television function identifier and/or the received 305 configuration information.

The API 100 sends 360 the infrared code. If the API 110 is configured on the computing device 100, the infrared code is sent 360 to the channel control system 150. The infrared code may be sent 360 as an infrared signal to the channel control system 150. However, the infrared signal may alternatively be sent over a wired or wireless network to the channel control system 150. For example, the channel control system 150 may be a smart TV or a network-capable set-top box that receives television function selections through a network. In embodiments in which an API 110 is configured on a server, the infrared code may alternatively be sent 360 to the computing device 100 over a network.

Example User Interface

Figure 4:
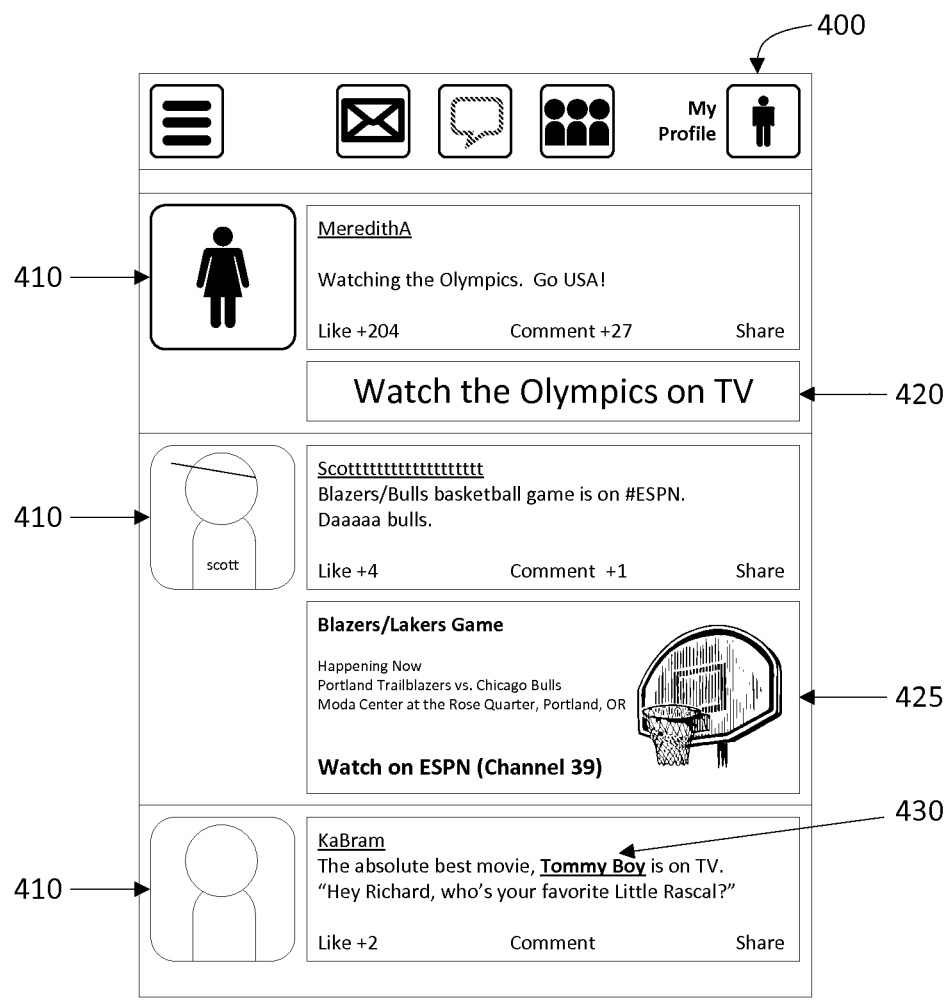
FIG. 4 illustrates one example of a user interface (UI) for selecting a television function for a channel control system through a computing device, according to one example embodiment.

Referring now to FIG. 4, illustrated is one example of a user interface for selecting a television function for a channel control system through a computing device, according to one example embodiment. The user interface may be part an application configured on the computing device 100. The application may be a configured to access a social network, as illustrated in FIG. 4. The user interface 400 of FIG. 4 illustrates multiple variants of a user interface element for selecting a television function through a computing device 100 on a social networking website.

The illustrated user interface 400 is a user interface may be a part of a conventional social networking website. However, the user interface 400 may be for any application that can be configured on a computing device 100. The user interface 400 includes one or more posts 410. The one or more posts 410 include a Tune-In button 420. The Tune-In button 420 is an interface that allows a user to select a television function on their channel control system 150 without exiting the application. In one embodiment, the Tune-In button 420 specifies a television program. The appearance of the Tune-In button 420 may change based on the specified television program. In this example, the Tune-In button 420 lists the Olympics as the specified television program. However, any text, image, graphic, or indicator may be displayed on the Tune-In button 420.

When a user activates the Tune-In button 420, the Tune-In button 420 prompts the computing device 100 to generate a request for an infrared code. The infrared code includes instructions to select a channel showing the television program specified by the Tune-In button 420.

The user interface 400 may additionally or alternatively include a more detailed Tune-In button 425. The detailed Tune-In button 425 is second embodiment of the Tune-In button 420. The detailed Tune-In button has the same functionality as the Tune-In button 420, but includes more information on the specified television program. For example, the detailed Tune-In button 425 includes one or more of a summary of the specified television program, a picture associated with the specified television program, and channel information. In the illustrated example, the detailed Tune-In button 425 includes a short summary of the television program ("Portland Trailblazers vs. Los Angeles Lakers"), a picture, and the channel the showing the television program (EPSN or Channel 39). The user or entity who posts the detailed Tune-In button 425 may select which information is included in the detailed Tune-In button 425.

The user interface 400 may also include a Tune-In button embodied as an in-text link 430. The text the Tune-In button is linked to may be generated or otherwise selected by the user.

Additional Configuration Considerations

The disclosed embodiments beneficially allow a user to share broadcast television programs through online links. Users interact with each other by sharing links to media content. However, users do not have a way of sharing television programs aired on broadcast television. A computing device 100 can be configured to allow a user to select a television function, such as selecting a television channel showing a particular television program, through the computing device 100. The selection of the television channel may be in response to the user activating a user interface element in an application configured on the computing device 100. For example, the selection of the television function may be in response to the user activating a link posted in a social networking application. Instructions to select the television channel showing the television program are sent to the channel control system 150.

The links allow users to share broadcast television shows with each other online. Furthermore, by determining the channel showing the television program, the disclosed embodiments are able to select any channel playing the television program without user input. This allows the user to seamlessly and instantly view the television program on television without having to search local electronic program guides or channel surf to find the channel showing the television program.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including a number of components or modules, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for selecting a television function through a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for instructing a channel control system through a computing device comprising:

associating each television service provider identifier in a set of television service provider identifiers with a television service provider and locations where the television service provider operates;

receiving, in response to a selection of a user interface element on the computing device associated with a television program, a request to display the television program on a television of the channel control system, the request including identifying information for the television program;

determining a location identifier for the computing device;

selecting a given television service provider identifier from the set of television service provider identifiers based on the location identifier, the location identifier indicating a location among the locations where the television service provider associated with the given television service provider identifier operates;

determining a television function identifier based on the given television service provider identifier and the identifying information for the television program, the television function identifier specifying a setting of the channel control system to display the television program on the television of the channel control system;

selecting at least one infrared code compatible with the channel control system based on the television function identifier for configuring the channel control system to display the television program on the television of the channel control system; and transmitting the at least one infrared code to the computing device.

2. The computer-implemented of claim 1, wherein selecting the at least one infrared code compatible with the channel control system further comprises selecting the at least one infrared code based on stored configuration information for the channel control system.

3. The computer-implemented of claim 2, wherein determining the television function identifier comprises:

transmitting the given television service provider identifier;

receiving electronic program guide information associated with the given television service provider identifier, the electronic program guide information including channel settings for television programs; and selecting the television function identifier specifying the setting of the channel control system to display the television program responsive to the electronic program guide information including a channel setting corresponding to the television program.

4. The computer-implemented of claim 1, further comprising determining an internet protocol address associated with the computing device, and wherein determining the location identifier is based on the internet protocol address associated with the computing device.

5. The computer-implemented of claim 1, further comprising receiving, from the computing device, configuration information including model information associated with the channel control system, and wherein the at least one infrared code compatible with the channel control system is selected based on the configuration information.

6. The computer-implemented of claim 1, wherein the channel control system further comprises at least one of a set-top box, and a digital video recorder.

7. The computer-implemented of claim 1, wherein the television function identifier specifying a setting of the channel control system comprises a television channel setting for the channel control system that corresponds to display of the television program.

8. The computer-implemented of claim 7, wherein the television channel includes digitally-distributed television channels obtained through online streaming.

9. The computer-implemented of claim 7, further comprising:

determining the channel control system does not have access to the television channel; and in response to determining the channel control system does not have access to the television channel, transmitting a notification to the computing device.

10. The computer-implemented of claim 9, wherein the notification provides an option for a user of the computing device to pay an access fee to enable the channel on the channel control system.

11. A system for making a selection for instructing a channel control system through a computing device, the system comprising:

a processor;

a non-transitory computer-readable storage medium storing computer program instructions that when executed by the processor perform steps to:

associate each television service provider identifier in a set of television service provider identifiers with a television service provider and locations where the television service provider operates;

receive, in response to a selection of a user interface element on the computing device associated with a television program, a request to display the television program on a television of the channel control system, the request including identifying information for the television program;

determine a location identifier for the computing device;

select a given television service provider identifier from the set of television service provider identifiers based on the location identifier, the location identifier indicating a location among the locations where the television service provider associated with the given television service provider identifier operates;

determine a television function identifier based on the given television service provider identifier and the identifying information for the television program, the television function identifier specifying a setting of the channel control system to display the television program on the television of the channel control system;

select at least one infrared code compatible with the channel control system based on the television function identifier for configuring the channel control system to display the television program on the television of the channel control system; and transmit the at least one infrared code to the computing device.

12. The system of claim 11, wherein selecting the at least one infrared code compatible with the channel control system further comprises selecting the at least one infrared code based on stored configuration information for the channel control system.

13. The system of claim 11, wherein determining the television function identifier comprises:

transmitting the given television service provider identifier;

receiving electronic program guide information associated with the given television service provider identifier, the electronic program guide information including channel settings for television programs; and selecting the television function identifier specifying the setting of the channel control system to display the television program responsive to the electronic program guide information including a channel setting corresponding to the television program.

14. The system of claim 11, further comprising instructions to determine an internet protocol address associated with the computing device, and wherein determining the location identifier is based on the internet protocol address associated with the computing device.

15. The system of claim 11, further comprising instructions to receive, from the computing device, configuration information including model information associated with the channel control system, and wherein the at least one infrared code compatible with the channel control system is selected based on the configuration information.

16. The system of claim 11, wherein the channel control system further comprises at least one of a set-top box, and a digital video recorder.

17. The system of claim 11, wherein the television function identifier specifying a setting of the channel control system comprises a television channel setting for the channel control system that corresponds to display of the television program.

18. The system of claim 17, wherein the television channel includes digitally-distributed television channels obtained through online streaming.

19. The system of claim 17, further comprising instructions to:
    determine the channel control system does not have access to the television channel; and
    in response to determining the channel control system does not have access to the television channel, transmit a notification to the computing device.

20. The system of claim 19, wherein the notification provides an option for a user of the computing device to pay an access fee to enable the channel on the channel control system.

* * * * *